United States Patent
Shao et al.

(10) Patent No.: US 11,446,566 B2
(45) Date of Patent: Sep. 20, 2022

(54) IN-GAME DISPLAY CONTROL METHOD AND APPARATUS, STORAGE MEDIUM PROCESSOR, AND TERMINAL

(71) Applicant: NETEASE (HANGZHOU) NETWORK CO., LTD., Zhejiang (CN)

(72) Inventors: Kun Shao, Zhejiang (CN); Zheng Jin, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

(21) Appl. No.: 16/640,361

(22) PCT Filed: May 10, 2019

(86) PCT No.: PCT/CN2019/086461
§ 371 (c)(1),
(2) Date: Feb. 20, 2020

(87) PCT Pub. No.: WO2020/143145
PCT Pub. Date: Jul. 16, 2020

(65) Prior Publication Data
US 2021/0362042 A1 Nov. 25, 2021

(30) Foreign Application Priority Data
Jan. 10, 2019 (CN) .......................... 201910024666.3

(51) Int. Cl.
*A63F 13/2145* (2014.01)
*A63F 13/5255* (2014.01)
(Continued)

(52) U.S. Cl.
CPC ...... *A63F 13/2145* (2014.09); *A63F 13/5255* (2014.09); *A63F 13/5258* (2014.09);
(Continued)

(58) Field of Classification Search
None
See application file for complete search history.

(56) References Cited

U.S. PATENT DOCUMENTS 6,200,138 B1 * 3/2001 Ando .................. A63F 13/56
463/31
6,504,539 B1 * 1/2003 Hiraki .................. A63F 13/10
345/427
(Continued)

FOREIGN PATENT DOCUMENTS

CN 107213643 A 9/2017
CN 107441705 A 12/2017
(Continued)

OTHER PUBLICATIONS

English Translation of JP2015221211A, Feb. Feb. 25, 2022, http://translationportal.epo.org/emtp/translate/?ACTION=description-retrieval&COUNTRY=JP&ENGINE=google&FORMAT=docdb&KIND=A&LOCALE=en_EP&NUMBER=2015221211&OPS=ops.epo.org/3.2&SRCLANG=ja&TRGLANG=en , pp. 1-16 (Year: 2022).*

*Primary Examiner* — Tramar Harper
(74) *Attorney, Agent, or Firm* — Gang Yu (57) ABSTRACT

An in-game display control method and apparatus, a storage medium, a processor, and a terminal are provided. The method includes that: a touch area is configured on a graphical user interface; in response to a first touch operation acting on the touch area, a movement of a first virtual character in a game scene is controlled according to the first touch operation; a scene display area is updated according to a first position of the first virtual character in the game scene; whether a second virtual character satisfying a preset condition is detected to exist in a preset area of the first position; when the second virtual character satisfying the preset condition is detected to exist in the preset area of the first
(Continued)

position, a second position of the second virtual character is acquired; and the scene display area is updated according to the first position and the second position.

17 Claims, 3 Drawing Sheets

(51) Int. Cl.
    *A63F 13/5258*     (2014.01)
    *A63F 13/58*     (2014.01)
    *A63F 13/69*     (2014.01)
    *A63F 13/822*     (2014.01)

(52) U.S. Cl.
    CPC .............. *A63F 13/58* (2014.09); *A63F 13/69* (2014.09); *A63F 13/822* (2014.09)

(56) References Cited

U.S. PATENT DOCUMENTS

| | | | | |
|---|---|---|---|---|
| 6,821,206 | B1* | 11/2004 | Ishida | A63F 13/533 |
| | | | | 463/31 |
| 11,090,555 | B2* | 8/2021 | Miao | A63F 13/95 |
| 2002/0142834 | A1* | 10/2002 | Sobue | A63F 13/12 |
| | | | | 463/30 |
| 2004/0157662 | A1* | 8/2004 | Tsuchiya | A63F 13/10 |
| | | | | 463/32 |
| 2005/0266921 | A1* | 12/2005 | Hayashida | G06T 15/20 |
| | | | | 463/33 |
| 2007/0298881 | A1* | 12/2007 | Kawamura | A63F 13/833 |
| | | | | 463/33 |
| 2008/0188302 | A1* | 8/2008 | Haga | A63F 13/52 |
| | | | | 463/31 |
| 2010/0020080 | A1* | 1/2010 | Iwanaga | G06T 15/60 |
| | | | | 345/426 |
| 2011/0312407 | A1* | 12/2011 | Sakurai | A63F 13/497 |
| | | | | 463/23 |
| 2012/0309480 | A1* | 12/2012 | Kashitani | A63F 13/10 |
| | | | | 463/8 |
| 2013/0225289 | A1* | 8/2013 | Yoshimitsu | A63F 13/00 |
| | | | | 463/31 |
| 2013/0288790 | A1* | 10/2013 | Wang | A63F 13/2145 |
| | | | | 463/31 |
| 2014/0282112 | A1* | 9/2014 | Begosa | G06F 3/04815 |
| | | | | 715/757 |
| 2015/0065243 | A1* | 3/2015 | Mizrahi | A63F 13/5258 |
| | | | | 463/31 |
| 2016/0129345 | A1* | 5/2016 | Seok | A63F 13/213 |
| | | | | 463/31 |
| 2016/0275717 | A1* | 9/2016 | Mizoguchi | A63F 13/577 |
| 2017/0291108 | A1* | 10/2017 | Kim | A63F 13/525 |
| 2018/0028918 | A1* | 2/2018 | Tang | A63F 13/5378 |
| 2018/0161674 | A1* | 6/2018 | Kohara | A63F 13/52 |
| 2018/0311579 | A1 | 11/2018 | Matsui et al. | |
| 2018/0369693 | A1* | 12/2018 | Rong | G06F 3/0484 |
| 2019/0022521 | A1* | 1/2019 | Wang | G06F 3/04883 |

FOREIGN PATENT DOCUMENTS

| | | |
|---|---|---|
| CN | 107551537 A | 1/2018 |
| CN | 107754308 A | 3/2018 |
| CN | 108126344 A | 6/2018 |
| CN | 108196765 A | 6/2018 |
| CN | 108837506 A | 11/2018 |
| CN | 109675307 A | 4/2019 |
| JP | 2015221211 A * | 12/2015 |

* cited by examiner

IN-GAME DISPLAY CONTROL METHOD AND APPARATUS, STORAGE MEDIUM PROCESSOR, AND TERMINAL

CROSS-REFERENCE TO RELATED APPLICATIONS

The present disclosure claims priority of Chinese Patent Application No. 201910024666.3, filed to China Patent Office on Oct. 1, 2019. Contents of the present disclosure are hereby incorporated by reference in entirety of the Chinese Patent Application.

TECHNICAL FIELD

The present disclosure relates to the field of computers, and in particular to an in-game display control method and apparatus, a storage medium, a processor, and a terminal.

BACKGROUND

At present, in mainstream Multiplayer Online Battle Arena (MOBA) mobile games, game scenes are usually observed by a basic manner of fixed lens and lens dragging. In addition, some games will carry out targeted lens interaction design for a few specific types of heroic characters based on the basic manner of fixed lens and lens dragging. Or, some games, will also carry out supplementary design in terms of specific lenses. For example, game players may manually switch a lens height mode.

The fixed lens means that a center of the lens is fixed on the body of a game character model by default, and a height of the lens is a fixed value by default. A game player may move a camera by clicking and dragging on a specific area of a screen, and a drag speed of the virtual camera is different in different types of games. In some MOBA mobile games, the longest drag distance may reach ¼ of the maximum battlefield length. In another part of the MOBA mobile games, the longest drag distance may reach almost the entire battlefield.

In addition, when a game player clicks on a mini map in a user interface, the virtual camera will be immediately moved to the clicked position; and when the game player continuously performs a dragging operation after performing the clicking operation, the virtual camera will also follow the movement until the game player releases the hand, and the virtual camera will automatically return to an initial position of this camera.

However, in the current MOBA mobile games on the market, due to limitation of a two-handed interaction mode, most of the games use a fixed lens and lens dragging solution to meet demands of game players for battlefield horizon and lens operations. However, according to the above analysis, it can be known that this solution combining a fixed lens and an active dragging lens can meet the most basic functional requirements, lacks favorable adaptability and scalability for special situations and operations that occur in the game, and cannot meet game experience needs of game players at different levels.

As to the problem mentioned above, no effective solution has been provided yet.

SUMMARY

At least some embodiments of the present disclosure provide an in-game display control method and apparatus, a storage medium, a processor, and a terminal, so as at least to partially solve a technical problem that an adjustment mode of an in-game virtual lens provided in the related art has a single operation mode, lacks favorable adaptability and scalability, and cannot meet game experience requirements of game players at different levels.

In an embodiment of the present disclosure, an in-game display control method is provided. This method is applied to a mobile terminal having at least one processor for executing a software application and a touch screen which is rendered with a graphical user interface. A game scene of a game may include a preset first virtual character and a scene display area. The scene display area may be at least part of the game scene. Contents rendered on the graphical user interface may include the scene display area. The method may include that:

a touch area is configured on the graphical user interface; in response to a first touch operation acting on the touch area, the movement of the first virtual character in the game scene is controlled according to the first touch operation; the scene display area is updated according to a first position of the first virtual character in the game scene; whether a second virtual character satisfying a preset condition is detected to exist in a preset area of the first position; when the second virtual character satisfying the preset condition is detected to exist in the preset area of the first position, a second position of the second virtual character is acquired; and the scene display area is updated according to the first position and the second position;

and the method may further include that: whether a virtual character attribute value of the first virtual character is less than a first preset threshold is determined; and when the virtual character attribute value of the first virtual character is less than the first preset threshold, the first position of the first virtual character in the game scene is acquired.

Optionally, the operation that whether the second virtual character satisfying the preset condition is detected to exist in the preset area may include that: a first movement direction of the second virtual character relative to the first virtual character is acquired; and whether the second virtual character of which the first movement direction satisfies the preset condition is detected to exist in the preset area.

Optionally, the operation that the movement of the first virtual character in the game scene is controlled according to the first touch operation may include that: a second movement direction of the first virtual character in the game scene is controlled according to the first touch operation; and whether the second virtual character satisfying the preset condition is detected to exist in the preset area may include that: whether the second virtual character of which the first movement direction is the same as the second movement direction is detected to exist in the preset area.

Optionally, the operation that whether the second virtual character satisfying the preset condition is detected to exist in the preset area may include that: whether the second virtual character of which a virtual character attribute value is less than a second preset threshold is detected to exist in the preset area.

Optionally, the operation that the scene display area is updated according to the first position and the second position may include that: a focus position is determined according to the first position and the second position; and the scene display area is updated according to the focus position.

Optionally, the operation that the scene display area is updated according to the focus position may include that: a movement of the scene display area is controlled according to a movement of the focus position.

Optionally, a virtual camera corresponding to the first virtual character may be configured in the game scene, and the scene display area may be an area shot by the virtual camera.

Optionally, the operation that the scene display area is updated according to the first position and the second position may include that: an adjustment direction of the virtual camera is determined according to the first position and the second position; a movement of the virtual camera is controlled according to the adjustment direction; and the scene display area is updated according to the movement of the virtual camera.

Optionally, the method may further include that: a second touch operation acting on a preset position of the graphical user interface is detected; and according to the second touch operation, the scene display area is controlled to restore to a state before updating the scene display area according to the first position and the second position.

Optionally, after updating the scene display area according to the first position and the second position, the method may further include that: when the second virtual character is out of the preset area, the scene display area is controlled to restore to a state before updating the scene display area according to the first position and the second position.

In another embodiment of the present disclosure, an in-game display control apparatus is also provided. This apparatus is applied to a mobile terminal having at least one processor for executing a software application and a touch screen which is rendered with a graphical user interface. A game scene of a game may include a preset first virtual character and a scene display area. The scene display area may be at least part of the game scene, and contents rendered on the graphical user interface may include the scene display area. The apparatus may include: a configuration component, configured to configure a touch area on the graphical user interface; a control component, configured to, in response to a first touch operation acting on the touch area, control a movement of the first virtual character in the game scene according to the first touch operation; a first update component, configured to update the scene display area according to a first position of the first virtual character in the game scene; a detection component, configured to detect whether a second virtual character satisfying a preset condition exists in a preset area of the first position; an acquisition component, configured to, when the second virtual character satisfying the preset condition is detected to exist in the preset area of the first position, acquire a second position of the second virtual character; and a second update component, configured to update the scene display area according to the first position and the second position;

and the apparatus may further include: a processing component, configured to, when the virtual character attribute value of the first virtual character is less than a first preset threshold, acquire the first position of the first virtual character in the game scene.

Optionally, the detection component may include: an acquisition element, configured to acquire a first movement direction of the second virtual character relative to the first virtual character; and a detection element, configured to detect whether the second virtual character of which the first movement direction satisfies the preset condition exists in the preset area.

Optionally, the control component may be configured to control a second movement direction of the first virtual character in the game scene according to the first touch operation; and the detection component may be configured to detect whether the second virtual character of which the first movement direction is the same as the second movement direction exists in the preset area.

Optionally, the detection component may be configured to detect whether the second virtual character of which a virtual character attribute value is less than a second threshold exists in the preset area.

Optionally, the second update component may include: a first determination element, configured to determine a focus position according to the first position and the second position; and a first update element, configured to update the scene display area according to the focus position.

Optionally, the first update element may be configured to control a movement of the scene display area according to a movement of the focus position.

Optionally, a virtual camera corresponding to the first virtual character may be configured in the game scene, and the scene display area may be an area shot by the virtual camera.

Optionally, the second update component may include: a second determination element, configured to determine an adjustment direction of the virtual camera according to the first position and the second position; a control element, configured to control a movement of the virtual camera according to the adjustment direction; and a second update element, configured to update the scene display area according to the movement of the virtual camera.

Optionally, the apparatus may further include: a first reset component, configured to detect a second touch operation acting on a preset position of the graphical user interface, and control, according to the second touch operation, the scene display area to restore to a state before updating the scene display area according to the first position and the second position.

Optionally, the apparatus may further include: a second reset component, configured to, when the second virtual character is out of the preset area, control the scene display area to restore to a state before updating the scene display area according to the first position and the second position.

In another embodiment of the present disclosure, a storage medium is also provided, which may include a stored program. When the stored program is run, a device where the storage medium is located may be controlled to perform the in-game display control method as mentioned above.

In another embodiment of the present disclosure, a processor is also provided. The processor may be configured to run a program. When the program is run, the in-game display control method as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the in-game display control method as mentioned above.

In at least some embodiments of the present disclosure, the touch area is configured on the graphical user interface; according to the first touch operation acting on the touch area, the movement of the first virtual character in the game scene is controlled, the scene display area is updated according to the first position of the first virtual character in the game scene, and when the second virtual character satisfying the preset condition is detected to exist in the preset area of the first position, the second position of the second virtual character is acquired, so that the scene display area is updated according to the first position and the second position, thereby achieving an aim of updating the scene display area according to the first position of the first virtual character in the game scene and the second position of the second virtual character satisfying the preset condition in the preset area of the first position. Therefore, a technical effect of realizing an intelligent scene display area adjustment mode to make the scene display area adjustment mode more flexible and intelligent is achieved, thereby solving the technical problem that the adjustment mode of the in-game virtual lens provided in the related art has the single operation mode, lacks favorable adaptability and scalability, and cannot meet the game experience requirements of game players at different levels.

BRIEF DESCRIPTION OF THE DRAWINGS

The accompanying drawings described herein are used for providing a further understanding of the present disclosure, and constitute a part of the present application, and exemplary embodiments of the present disclosure and the description thereof are used for explaining the present disclosure, but do not constitute improper limitations to the present disclosure. In the drawings.

DETAILED DESCRIPTION

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In another embodiment of the present disclosure, an in-game display control method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission apparatus and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the in-game display control method in the embodiment of the present disclosure, and the processor executes various functional applications and data processing by running the computer program stored in the memory, that is, implements the above in-game display control method. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

Figure 1:
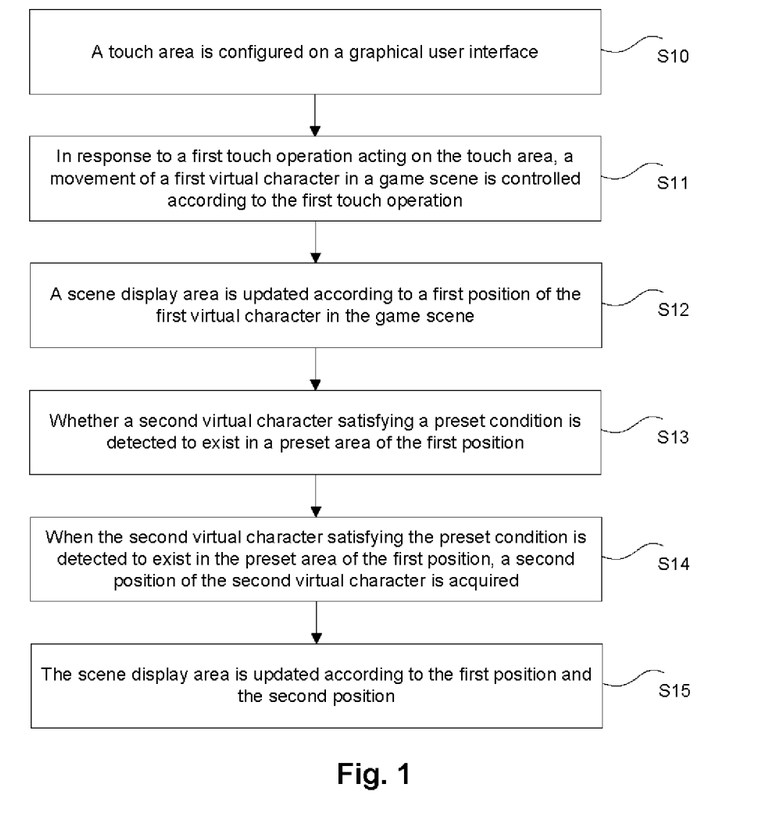
FIG. 1 is a flowchart of an in-game display control method according to an embodiment of the present disclosure.

In the present embodiment, an in-game display control method running on the above mobile terminal is provided. This method is applied to a mobile terminal having at least one processor for executing a software application and a touch screen which is rendered with a graphical user interface. A game scene of a game includes a preset first virtual character and a scene display area. The scene display area is at least part of the game scene. Contents rendered on the graphical user interface include the scene display area. FIG. 1 is a flowchart of an in-game display control method according to an embodiment of the present disclosure. As shown in FIG. 1, the method includes the following steps.

At step S10, a touch area is configured on the graphical user interface.

At step S11, in response to a first touch operation acting on the touch area, the movement of the first virtual character in the game scene is controlled according to the first touch operation.

At step S12, the scene display area is updated according to a first position of the first virtual character in the game scene.

At step S13, whether a second virtual character satisfying a preset condition exists in a preset area of the first position is detected.

At step S14, when the second virtual character satisfying the preset condition is detected to exist in the preset area of the first position, a second position of the second virtual character is acquired.

At step S15, the scene display area is updated according to the first position and the second position.

By means of the above steps, the touch area is configured on the graphical user interface; according to the first touch operation acting on the touch area, the movement of the first virtual character in the game scene is controlled, the scene display area is updated according to the first position of the first virtual character in the game scene, and when the second virtual character satisfying the preset condition is detected to exist in the preset area of the first position, the second position of the second virtual character is acquired, so that the scene display area is updated according to the first position and the second position, thereby achieving an aim of updating the scene display area according to the first position of the first virtual character in the game scene and the second position of the second virtual character satisfying the preset condition in the preset area of the first position. Therefore, a technical effect of realizing an intelligent scene display area adjustment mode to make the scene display area adjustment mode more flexible and intelligent is achieved, thereby solving the technical problem that the adjustment mode of the in-game virtual lens provided in the related art has the single operation mode, lacks favorable adaptability and scalability, and cannot meet the game experience requirements of game players at different levels.

It is to be noted that the operation of controlling the movement of the first virtual character in the game scene through the first touch operation to update the scene display area according to the first position of the first virtual character in the game scene described at step S11 to step S12 does not have a strict timing relationship with the operation of updating the scene display area according to the first position and the second position described at step S15. In other words, the operation of updating the scene display area described at step S11 to step S12 may occur before the operation of updating the scene display area described at step S15, may also occur after the operation of updating the scene display area described at step S15, or may also occur while the operation of updating the scene display area described at step S15. Therefore, it is not strictly limited in the embodiments of the present disclosure.

The touch area may be a direction control located on a lower left area of the graphical user interface. The preset area may be flexibly set according to the size of the game scene.

In the related art, when a second virtual character satisfying a preset condition is detected to exist in a preset area of the first position, the current scene display area will not be updated, so that before a game player performs the next operation in time, the second virtual character has left the current scene display area or the first virtual character controlled by this game player is killed by the second virtual character, and the game experience is poor. Conversely, through the technical solution provided by the embodiments of the present disclosure, when the second virtual character satisfying the preset condition exists in the preset area of the first position, the scene display area may be updated according to the location of the first virtual character and the location of the second virtual character, so that the game player has a better game horizon, and real-time dynamics of the two virtual characters are observed in time, in order to take timely countermeasures.

Optionally, at step S13, the operation that whether the second virtual character satisfying the preset condition is detected to exist in the preset area of the first position may include the following execution steps.

At step S131, a first movement direction of the second virtual character relative to the first virtual character is acquired.

At step S132, whether the second virtual character of which the first movement direction satisfies the preset condition is detected to exist in the preset area.

Through acquiring the first movement direction of the second virtual character relative to the first virtual character, when the first movement direction of the second virtual character is determined to be the same as the orientation of the first virtual character, the second virtual character of which the first movement direction satisfying the preset condition is determined to exist in the preset area. When the first movement direction of the second virtual character is determined to be opposite to the orientation of the first virtual character, whether the second virtual character and the first virtual character move toward each other or away from each other may be further determined. When the second virtual character and the first virtual character move toward each other, the second virtual character of which the first movement direction satisfying the preset condition is determined to exist in the preset area. When the second virtual character and the first virtual character move away from each other, the second virtual character of which the first movement direction satisfying the preset condition does not exist in the preset area.

Optionally, at step S11, the operation that the movement of the first virtual character in the game scene is controlled according to the first touch operation may include the following execution steps.

At step S111, a second movement direction of the first virtual character in the game scene is controlled according to the first touch operation.

At step S13, the operation that whether a second virtual character satisfying a preset condition is detected to exist in a preset area of the first position may include the following execution steps.

At step S133, whether the second virtual character of which the first movement direction is the same as the second movement direction is detected to exist in the preset area.

Through acquiring the first movement direction of the second virtual character and the second movement direction of the first virtual character, whether the second virtual character and the first virtual character move in the same direction or the reverse direction currently is determined. When the second virtual character and the first virtual character move in the same direction currently, the second virtual character of which the first movement direction is the same as the second movement direction is determined to exist in the preset area. When the second virtual character and the first virtual character move in the reverse direction currently, the second virtual character of which the first movement direction is the same as the second movement direction is determined not to exist in the preset area.

Optionally, at step S13, the operation that whether a second virtual character satisfying a preset condition is detected to exist in a preset area of the first position may include the following execution steps.

At step S134, whether the second virtual character of which a virtual character attribute value is less than a second preset threshold is detected to exist in the preset area.

The virtual character attribute value of the second virtual character may be a blood volume value of the second virtual character. When the second virtual character is in a full blood state or has a sufficient amount of blood (that is, the blood volume value of the second virtual character is greater than or equal to a first second preset threshold), there is no need to acquire the second position of the second virtual character in the game scene. However, when the second virtual character is in a residual blood state (that is, the blood volume value of the second virtual character is less than the second preset threshold), the second position of the second virtual character in the game scene needs to be acquired, and the scene display area is further updated according to the first position and the second position, so as to achieve the pursuit of the residual blood of the second virtual character by obtaining a better game horizon.

Optionally, at step S15, the operation that a scene display area is updated according to the first position and the second position may include the following execution steps.

At step S151, a focus position is determined according to the first position and the second position.

At step S152, the scene display area is updated according to the focus position. That is, a movement of the scene display area may be controlled according to a movement of the focus position.

In order to enable the game player to obtain a better game horizon, after obtaining the first position of the first virtual character and the second position of the second virtual character, a focus position may be determined in an area between the first position and the second position. For example, a focus position is determined on a connecting line between the first position and the second position. Then, the virtual camera is shifted from the first virtual character controlled by the game player to the focus position, so that the scene display area is updated according to the focus position. When the focus position moves, the virtual camera will also follow the focus position to further update the scene display area.

Optionally, a virtual camera corresponding to the first virtual character is configured in the game scene, and the scene display area is an area shot by the virtual camera.

In an optional embodiment, the virtual camera may be fixed on the first virtual character controlled by the game player, move according to the movement of the virtual character, and rotate according to the rotation of the virtual character, which is similar to the subjective perspective of the virtual character. Therefore, the scene display area in the game scene is an area shot by the virtual camera. Of course, the game may also be set at a position relative to the first virtual character controlled by the game player, for example, set at a preset position above the first virtual character and follow the virtual character to move, which is similar to a third party's perspective relative to the virtual character. Therefore, the scene display area in the game scene is an area shot by the virtual camera. The following optional embodiments mainly take a virtual camera fixed at a relative position of a virtual character controlled by a game player as an example for detailed description. The implementation process is also applicable to setting a game on a virtual character controlled by a game player.

Optionally, at step S15, the operation that the scene display area is updated according to the first position and the second position may include the following execution steps.

At step S153, an adjustment direction of the virtual camera is determined according to the first position and the second position.

At step S154, a movement of the virtual camera is controlled according to the adjustment direction.

At step S155, the scene display area is updated according to the movement of the virtual camera.

In order to enable the game player to obtain a better game horizon, after obtaining the first position of the first virtual character and the second position of the second virtual character, the adjustment direction of the virtual camera may be determined according to the first position and the second position. In other words, the virtual camera may be fixed on the first virtual character controlled by the game player and shifted to the second position where the second virtual character is located (that is, the virtual camera moves in a direction from the first position to the second position). At this time, with the shift of the virtual camera, the scene display area is continuously updated, and the two virtual characters are kept in the same screen state in the updated scene display area during the continuous update of the scene display area. In the present embodiment, the operation of shifting the virtual camera from the first virtual character controlled by the game player to the second position where the second virtual character is located may be performed by moving the virtual camera from the first virtual character (that is, the first position) controlled by the game player to the focus position between the first position and the second position, so that the first virtual character and the second virtual character are displayed on the same screen.

Optionally, on the basis of steps S10 to S15, the following execution steps may be further included.

At step S16, whether a virtual character attribute value of the first virtual character is less than a first preset threshold is determined.

At step S17, when the virtual character attribute value of the first virtual character is less than the first preset threshold, the first position of the first virtual character in the game scene is acquired.

The virtual character attribute value of the first virtual character may be a blood volume value of the first virtual character. When the first virtual character is in a full blood state or has a sufficient amount of blood (that is, the blood volume value of the first virtual character is greater than or equal to a first preset threshold), there is no need to acquire the first position of the first virtual character in the game scene. However, when the first virtual character is in a residual blood state (that is, the blood volume value of the first virtual character is less than the first preset threshold), the first position of the first virtual character in the game scene needs to be acquired, and when the second virtual character satisfying the preset condition exists in the preset area of the first position, the scene display area may be updated according to the first position and the second position, so as to avoid being chased by the second virtual character by obtaining a better game horizon.

Optionally, on the basis of steps S10 to S15, the following execution steps may be further included.

At step S18, a second touch operation acting on a preset position of the graphical user interface is detected, and according to the second touch operation, the scene display area is controlled to restore to a state before updating the scene display area according to the first position and the second position.

The above second touch operation acting on the preset position of the graphical user interface has the function of canceling horizon adjustment and resetting the virtual camera. The second touch operation may be a touch operation acting on a specific cancellation control, or a touch operation acting on any blank area in the graphical interface, or an operation of sliding to a preset position in the opposite direction on a direction control on the basis of a current movement direction controlled by the direction control. Therefore, through the second touch operation, the scene display area may be controlled to restore to the state before updating the scene display area according to the first position and the second position. This state may be calculated by lens logic to automatically reset the virtual camera to the current position of the first virtual character to restore the original scene display area.

Optionally, after step S15, the scene display area is updated according to the first position and the second position, the method may further include the following execution steps.

At step S19, when the second virtual character is out of the preset area, the scene display area is controlled to restore to a state before updating the scene display area according to the first position and the second position.

When the second virtual character has deviated from the preset area, for example, the second virtual character has deviated from the preset area by using special skills such as teleport, sprint, and stealth, the scene display area is controlled to restore to the state before updating the scene display area according to the first position and the second position. This state may be calculated by lens logic to automatically reset the virtual camera to the current position of the first virtual character to restore the original scene display area.

The above optional implementation process will be further described in detail in combination with the following two exemplary embodiments.

Figure 2:
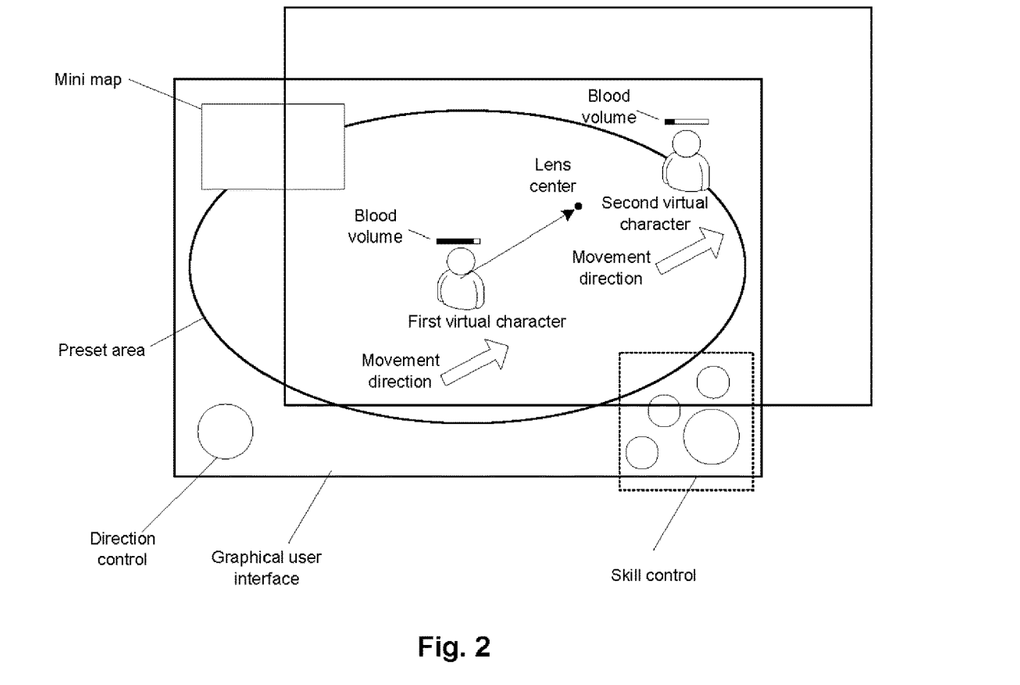
FIG. 2 is a schematic diagram of an in-game display control method according to a first optional embodiment 1 of the present disclosure.

In order to effectively avoid touching an edge of a display and blocking the horizon of a game player by a preset control on the graphical user interface, FIG. 2 is a schematic diagram of an in-game display control method according to a first optional embodiment of the present disclosure. As shown in FIG. 2, when a visible residual-blood second virtual character appears in a preset area around a first virtual character controlled by a game player, and/or when a movement direction of the second virtual character at a current location is consistent with a movement direction of the first virtual character, a virtual camera automatically shifts to the second virtual character, and the first virtual character and the second virtual character are kept in the same screen state in the updated scene display area during the continuous update of the scene display area.

Figure 3:
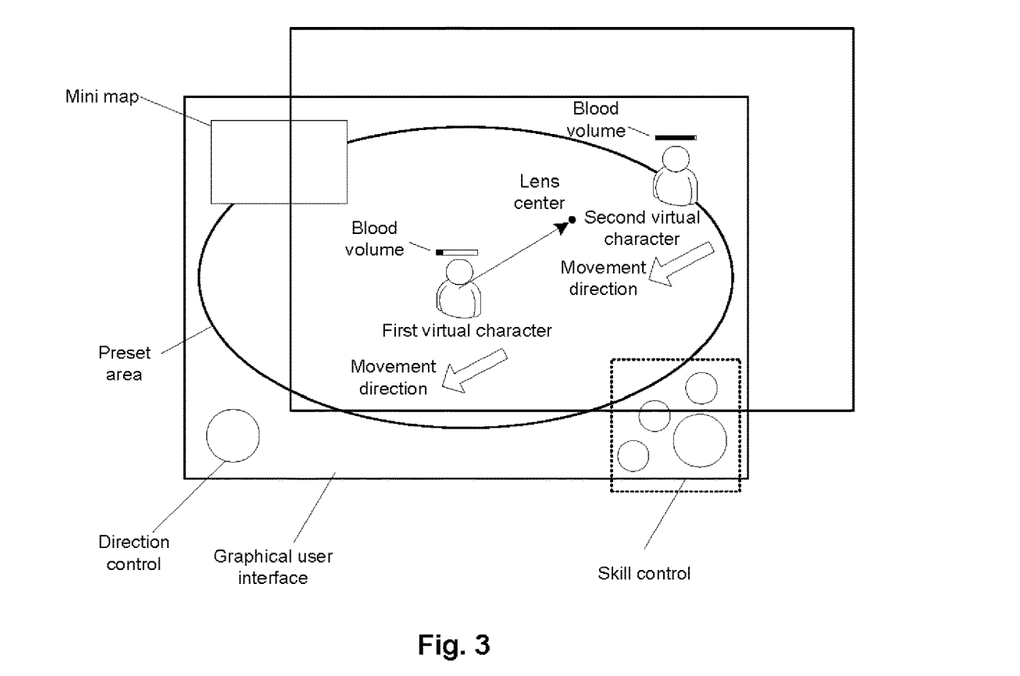
FIG. 3 is a schematic diagram of an in-game display control method according to a second optional embodiment of the present disclosure.

Similarly, in order to effectively avoid touching the edge of a display and blocking the horizon of a game player by a preset control on the graphical user interface, FIG. 3 is a schematic diagram of an in-game display control method according to a second optional embodiment of the present disclosure. As shown in FIG. 3, when a first virtual character controlled by a game player is in a residual blood state, a visible second virtual character appears in a preset area around the first virtual character, and when a movement direction of the second virtual character at a current location is consistent with a movement direction of the first virtual character, a virtual camera automatically shifts to the second virtual character, and the first virtual character and the second virtual character are kept in the same screen state in the updated scene display area during the continuous update of the scene display area.

By combining the foregoing embodiments, the following technical effects can be achieved:

At one, the comprehensive optimization of the current mainstream lens solutions has made up for the shortcomings of fixed and rigid lens modes in the current mainstream MOBA mobile game lens solutions and reliance on frequent operations by game players, which makes the operation of game lenses more flexible and intelligent. In addition, it has favorable extensibility, and leaves more design space for changes such as new gameplay methods and new characters to make the lens solution of the game more diversified and customized.

At two, for intelligent lens adjustment modes, according to differences of operating behaviors of game players and game situations where the game players are located, different ways of lens assistance are provided to meet the special needs of a game horizon, the fine adjustment operation of the lens is intelligentized, the operation burdens of the game players are reduced, and the game players can obtain current game information needed most in the most relaxed way, thereby improving the efficiency of game information transmission and providing the game players with a smoother game experience.

At three, game players and novice players with limited operation levels who are unable to use lens operations and receive battlefield information well can adapt to the game faster, and master game lens operation methods, and an intelligent solution is provided for a special lens operation, thereby reducing the learning cost of the game players, lowering the overall operation threshold of the game, and improving the coverage area of the corresponding user group of the game.

At four, the game players with high operation level are enabled to complete more fine game operations with the most convenient operations, thereby providing more room for improvement in the game skills of such game players, improving the game experience of such game players, and facilitating the retention of gamers at this level.

At five, as an overall optimization solution, it can adapt to the needs of game players at different levels and provide favorable conditions for the overall promotion and propagation of the game.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an in-game display control apparatus is also provided, which is configured to implement the above embodiments and optional implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 4:
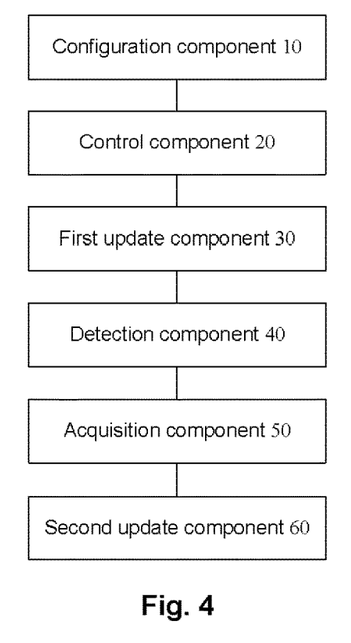
FIG. 4 is a structural block diagram of an in-game display control apparatus according to an embodiment of the present disclosure.

FIG. 4 is a structural block diagram of an in-game display control apparatus according to an embodiment of the present disclosure. As shown in FIG. 4, this apparatus is applied to a mobile terminal having at least one processor for executing a software application and a touch screen which is rendered with a graphical user interface, a game scene of a game includes a preset first virtual character and a scene display area, the scene display area is at least part of the game scene, and contents rendered on the graphical user interface includes the scene display area. The apparatus includes: a configuration component 10, configured to configure a touch area on the graphical user interface; a control component 20, configured to, in response to a first touch operation acting on the touch area, control a movement of the first virtual character in the game scene according to the first touch operation; a first update component 30, configured to update the scene display area according to a first position of the first virtual character in the game scene; a detection component 40, configured to detect whether a second virtual character satisfying a preset condition exists in a preset area of the first position; an acquisition component 50, configured to, when the second virtual character satisfying the preset condition is detected to exist in the preset area of the first position, acquire a second position of the second virtual character; and a second update component 60, configured to update the scene display area according to the first position and the second position.

Optionally, the detection component 40 includes: an acquisition element (not shown in the figure), configured to acquire a first movement direction of the second virtual character relative to the first virtual character; and a detection element (not shown in the figure), configured to detect whether the second virtual character of which the first movement direction satisfies the preset condition exists in the preset area.

Optionally, the control component 20 is configured to control a second movement direction of the first virtual character in the game scene according to the first touch operation; and the detection component 40 is configured to detect whether the second virtual character of which the first movement direction is the same as the second movement direction exists in the preset area.

Optionally, the detection component 40 is configured to detect whether the second virtual character of which a virtual character attribute value is less than a second preset threshold exists in the preset area.

Optionally, the second update component 60 includes: a first determination element (not shown in the figure), configured to determine a focus position according to the first position and the second position; and a first update element (not shown in the figure), configured to update the scene display area according to the focus position.

Optionally, the first update element (not shown in the figure) is configured to control a movement of the scene display area according to a movement of the focus position.

Optionally, a virtual camera corresponding to the first virtual character is configured in the game scene, and the scene display area is an area shot by the virtual camera.

Optionally, the second update component 60 includes: a second determination element (not shown in the figure), configured to determine an adjustment direction of the virtual camera according to the first position and the second position; a control element (not shown in the figure), configured to control a movement of the virtual camera according to the adjustment direction; and a second update element (not shown in the figure), configured to update the scene display area according to the movement of the virtual camera.

Figure 5:
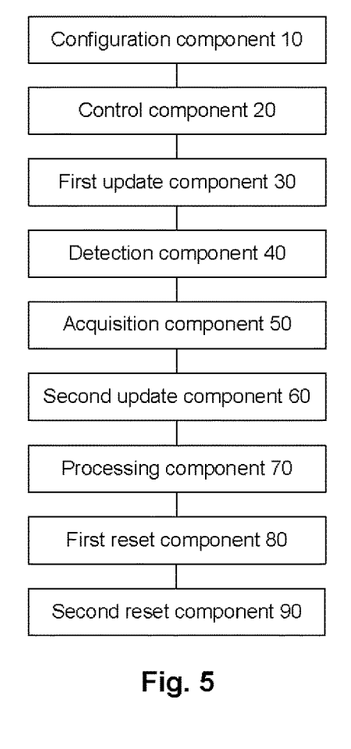
FIG. 5 is a structural block diagram of an in-game display control apparatus according to an optional embodiment of the present disclosure.

Optionally, FIG. 5 is a structural block diagram of an in-game display control apparatus according to an optional embodiment of the present disclosure. As shown in FIG. 5, the apparatus includes, in addition to all the components shown in FIG. 4, a processing component 70, configured to, when the virtual character attribute value of the first virtual character is less than the first preset threshold, acquire the first position of the first virtual character in the game scene.

Optionally, as shown in FIG. 5, the apparatus further includes: a first reset component 80, configured to detect a second touch operation acting on a preset position of the graphical user interface, and control, according to the second touch operation, the scene display area to restore to a state before updating the scene display area according to the first position and the second position.

Optionally, as shown in FIG. 5, the apparatus further includes: a second reset component 90, configured to, when the second virtual character is out of the preset area, control the scene display area to restore to a state before updating the scene display area according to the first position and the second position.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, where the computer program is configured to perform the steps in any one of the above method embodiments during running.

Optionally, in the present embodiment, the storage medium may be configured to store the computer program for performing the following steps.

At step S1, a touch area is configured on the graphical user interface.

At step S2, in response to a first touch operation acting on the touch area, a movement of the first virtual character in the game scene is controlled according to the first touch operation.

At step S3, the scene display area is updated according to a first position of the first virtual character in the game scene.

At step S4, whether a second virtual character satisfying a preset condition exists in a preset area of the first position is detected.

At step S5, when the second virtual character satisfying the preset condition is detected to exist in the preset area of the first position, a second position of the second virtual character is acquired.

At step S6, the scene display area is updated according to the first position and the second position.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure further provides a processor. The processor is configured to run a computer program to perform the steps in any one of the above method embodiments.

Optionally, in the present embodiment, the processor may be configured to perform the following steps through the computer program.

At step S1, a touch area is configured on the graphical user interface.

At step S2, in response to a first touch operation acting on the touch area, a movement of the first virtual character in the game scene is controlled according to the first touch operation.

At step S3, the scene display area is updated according to a first position of the first virtual character in the game scene.

At step S4, whether a second virtual character satisfying a preset condition exists in a preset area of the first position is detected.

At step S5, when the second virtual character satisfying the preset condition is detected to exist in the preset area of the first position, a second position of the second virtual character is acquired.

At step S6, the scene display area is updated according to the first position and the second position.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or at least two elements may be integrated into one element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. An in-game display control method, applied to a mobile terminal having at least one processor for executing a software application and a touch screen which is rendered with a graphical user interface, a game scene of a game comprising a preset first virtual character and a scene display area, the scene display area being at least part of the game scene, contents rendered on the graphical user interface comprising the scene display area, the method comprising:
   configuring a touch area on the graphical user interface;
   in response to a first touch operation acting on the touch area, controlling a movement of the first virtual character in the game scene according to the first touch operation;
   updating the scene display area according to a first position of the first virtual character in the game scene;
   detecting whether a second virtual character satisfying a preset condition exists in a preset area of the first position;
   when the second virtual character satisfying the preset condition is detected to exist in the preset area of the first position, acquiring a second position of the second virtual character; and
   updating the scene display area according to the first position and the second position;
   wherein the method further comprises: determining whether a virtual character attribute value of the first virtual character is less than a first preset threshold; and when the virtual character attribute value of the first virtual character is less than the first preset threshold, acquiring the first position of the first virtual character in the game scene.

2. The method as claimed in claim 1, wherein detecting whether the second virtual character satisfying the preset condition exists in the preset area comprises:
   acquiring a first movement direction of the second virtual character relative to the first virtual character; and
   detecting whether the second virtual character of which the first movement direction satisfies the preset condition exists in the preset area.

3. The method as claimed in claim 2, wherein
   controlling the movement of the first virtual character in the game scene according to the first touch operation comprises:
   controlling a second movement direction of the first virtual character in the game scene according to the first touch operation; and
   detecting whether the second virtual character satisfying the preset condition exists in the preset area comprises:
   detecting whether the second virtual character of which the first movement direction is the same as the second movement direction exists in the preset area.

4. The method as claimed in claim 3, wherein when the second virtual character and the first virtual character move in the same direction currently, the second virtual character of which the first movement direction is the same as the second movement direction is determined to exist in the preset area.

5. The method as claimed in claim 3, wherein when the second virtual character and the first virtual character move in a reverse direction currently, the second virtual character of which the first movement direction is the same as the second movement direction is determined not to exist in the preset area.

6. The method as claimed in claim 2, wherein when the first movement direction of the second virtual character is determined to be the same as an orientation of the first virtual character, the second virtual character of which the first movement direction satisfying the preset condition is determined to exist in the preset area.

7. The method as claimed in claim 2, wherein when the second virtual character and the first virtual character move toward each other, the second virtual character of which the first movement direction satisfying the preset condition is determined to exist in the preset area; and when the second virtual character and the first virtual character move away from each other, the second virtual character of which the first movement direction satisfying the preset condition does not exist in the preset area.

8. The method as claimed in claim 1, wherein detecting whether the second virtual character satisfying the preset condition exists in the preset area comprises:
detecting whether the second virtual character of which a virtual character attribute value is less than a second preset threshold exists in the preset area.

9. The method as claimed in claim 1, wherein updating the scene display area according to the first position and the second position comprises:
determining a focus position according to the first position and the second position; and
updating the scene display area according to the focus position.

10. The method as claimed in claim 9, wherein updating the scene display area according to the focus position comprises:
controlling a movement of the scene display area according to a movement of the focus position.

11. The method as claimed in claim 9, wherein the focus position is determined on a connecting line between the first position and the second position.

12. The method as claimed in claim 1, wherein a virtual camera corresponding to the first virtual character is configured in the game scene, and the scene display area is an area shot by the virtual camera.

13. The method as claimed in claim 12, wherein updating the scene display area according to the first position and the second position comprises:
determining an adjustment direction of the virtual camera according to the first position and the second position;
controlling a movement of the virtual camera according to the adjustment direction; and
updating the scene display area according to the movement of the virtual camera.

14. The method as claimed in claim 1, further comprising:
detecting a second touch operation acting on a preset position on the graphical user interface; and
controlling, according to the second touch operation, the scene display area to restore to a state before updating the scene display area according to the first position and the second position.

15. The method as claimed in claim 1, wherein after updating the scene display area according to the first position and the second position, the method further comprises:
when the second virtual character is out of the preset area, controlling the scene display area to restore to a state before updating the scene display area according to the first position and the second position.

16. A non-transitory computer readable storage medium, comprising a stored program, wherein when the stored program is run, a device where the non-transitory computer readable storage medium is located is controlled to perform an in-game display control method comprising the following steps:
configuring a touch area on a graphical user interface;
in response to a first touch operation acting on a touch area, controlling a movement of a first virtual character in a game scene according to the first touch operation;
updating a scene display area according to a first position of the first virtual character in the game scene;
detecting whether a second virtual character satisfying a preset condition exists in a preset area of the first position;
when the second virtual character satisfying the preset condition is detected to exist in the preset area of the first position, acquiring a second position of the second virtual character; and
updating the scene display area according to the first position and the second position;
wherein the method further comprises: determining whether a virtual character attribute value of the first virtual character is less than a first preset threshold; and when the virtual character attribute value of the first virtual character is less than the first preset threshold, acquiring the first position of the first virtual character in the game scene.

17. A terminal, comprising: at least one processor, a memory, a display device, and at least one program, wherein the at least one program is stored in the memory, and configured to be run by the at least one processor, the at least one program being configured to perform an in-game display control method comprising the following steps:
configuring a touch area on a graphical user interface;
in response to a first touch operation acting on a touch area, controlling a movement of a first virtual character in a game scene according to the first touch operation;
updating a scene display area according to a first position of the first virtual character in the game scene;
detecting whether a second virtual character satisfying a preset condition exists in a preset area of the first position;
when the second virtual character satisfying the preset condition is detected to exist in the preset area of the first position, acquiring a second position of the second virtual character; and
updating the scene display area according to the first position and the second position;
wherein the method further comprises: determining whether a virtual character attribute value of the first virtual character is less than a first preset threshold; and when the virtual character attribute value of the first virtual character is less than the first preset threshold, acquiring the first position of the first virtual character in the game scene.

* * * * *